US012675887B2

(12) United States Patent　　　　(10) Patent No.:　US 12,675,887 B2
Qi et al.　　　　　　　　　　　　　(45) Date of Patent:　　　Jul. 7, 2026

(54) HIGH THROUGHPUT POINT CLOUD PROCESSING

(71) Applicant: Waymo LLC, Mountain View, CA (US)

(72) Inventors: Ruizhongtai Qi, Mountain View, CA (US); Yurong You, Ithaca, NY (US); Yingwei Li, Middle River, MD (US); Chenxi Liu, Santa Clara, CA (US); Yin Zhou, San Jose, CA (US)

(73) Assignee: Waymo LLC, Mountain View, CA (US)

( * ) Notice: Subject to any disclaimer, the term of this patent is extended or adjusted under 35 U.S.C. 154(b) by 368 days.

(21) Appl. No.: 18/235,292

(22) Filed: Aug. 17, 2023

(65) Prior Publication Data

US 2024/0062386 A1　　Feb. 22, 2024

Related U.S. Application Data

(60) Provisional application No. 63/399,576, filed on Aug. 19, 2022.

(51) Int. Cl.
G06T 7/246　　　(2017.01)
G06T 7/215　　　(2017.01)

(52) U.S. Cl.
CPC ..............　G06T 7/246 (2017.01); G06T 7/215 (2017.01); *G06T 2207/10016* (2013.01);
(Continued)

(58) Field of Classification Search
None
See application file for complete search history.

(56) References Cited

U.S. PATENT DOCUMENTS 11,164,363 B2　11/2021　Zhou et al.
2019/0341930 A1 *　11/2019　Pavlovic ............. H03M 7/3088
(Continued)

FOREIGN PATENT DOCUMENTS

CN　　　111160258　　　5/2020

OTHER PUBLICATIONS

Extended Search Report in European Appln. No. 23192169.3, dated Jan. 19, 2024, 10 pages.
(Continued)

*Primary Examiner* — Vikkram Bali
(74) *Attorney, Agent, or Firm* — Fish & Richardson P.C.

(57)　　　　　　ABSTRACT

Methods, systems, and apparatus, including computer programs encoded on computer storage media, for processing sensor data, e.g., laser sensor data, using neural networks. One of the methods includes obtaining a temporal sequence of multiple three-dimensional point clouds generated from sensor readings of an environment collected by one or more sensors within a given time period, each three-dimensional point cloud comprising a respective plurality of points in a first coordinate system; processing, using a feature extraction neural network, an input that comprises data derived from the temporal sequence of multiple three-dimensional point clouds to generate a feature embedding; receiving a query that specifies one time point within the given time period; and generating, from the feature embedding and conditioned on the query, one or more outputs that characterize one or more objects in the environment at the time point specified in the received query.

20 Claims, 5 Drawing Sheets

(52) U.S. Cl.
CPC .............. *G06T 2207/10028* (2013.01); *G06T 2207/20084* (2013.01); *G06T 2207/30252* (2013.01)

(56) References Cited

U.S. PATENT DOCUMENTS

| | | | | |
|---|---|---|---|---|
| 2020/0393567 | A1* | 12/2020 | Schroeter | ............... G01S 19/01 |
| 2021/0103744 | A1* | 4/2021 | Gao | ....................... G06V 20/58 |
| 2022/0137227 | A1 | 5/2022 | Armstrong-Crews et al. | |
| 2023/0177719 | A1* | 6/2023 | Babin | ................... G01S 7/4808 701/445 |

OTHER PUBLICATIONS

Huang et al., "An LSTM Approach to Temporal 3D Object Detection in LiDAR Point Clouds," European Conference on Computer Vision, Dec. 4, 2020, 18 pages.

Qi et al., "Offboard 3D Object Detection From Point Cloud Sequences," Proceedings of the IEEE/CVF Conference on Computer Vision and Pattern Recognition (CVPR), 2021, pp. 6134-6144.

Qi et al., "Pointnet: Deep learning on point sets for 3d classification and segmentation," Proceedings of the IEEE conference on computer vision and pattern recognition (CVPR), 2017, pp. 652-660.

Ronneberger et al., "U-net: Convolutional networks for biomedical image segmentation," International Conference on Medical Image Computing and Computer-Assisted Intervention, Nov. 18, 2015, pp. 234-241.

Wang et al., "Anchor-Based Spatio-Temporal Attention 3-D Convolutional Networks for Dynamic 3-D Point Cloud Sequences," IEEE Transactions on Instrumentation and Measurement, Aug. 25, 2021, 70:5015111.

Yang et al., "3D-MAN: 3D Multi-Frame Attention Network for Object Detection," Proceedings of the IEEE/CVF Conference on Computer Vision and Pattern Recognition (CVPR), 2021, pp. 1863-1872.

* cited by examiner

300

Obtain a temporal sequence of multiple three-dimensional point clouds ⌐302

Processing an input using a feature extraction neural network to generate a feature embedding ⌐304

Receive a query that specifies one time point ⌐306

Generate, from the feature embedding and conditioned on the query, one or more outputs ⌐308

Identify (i) a first plurality of points that correspond to one or more dynamic objects and (ii) a second plurality of points that correspond to one or more static objects ⟋402

Generate multiple first sensor data segments and a second sensor data segment ⟋404

Process an input using the feature extraction neural network to generate the feature embedding ⟋406

500

502

Generate a temporal embedding from the query

504

Determine a concatenation of the temporal embedding and the feature embedding

506

Process the concatenation using an output neural network to generate the one or more outputs

HIGH THROUGHPUT POINT CLOUD PROCESSING

CROSS-REFERENCE TO RELATED APPLICATION

This application claims priority to U.S. Provisional Application No. 63/399,576, filed on Aug. 19, 2022. The disclosure of the prior application is considered part of and is incorporated by reference in the disclosure of this application.

BACKGROUND

This specification relates to processing sensor data, e.g., laser sensor data, using neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

BRIEF DESCRIPTION OF THE DRAWINGS

Like reference numbers and designations in the various drawings indicate like elements.

DETAILED DESCRIPTION

Figure 1:
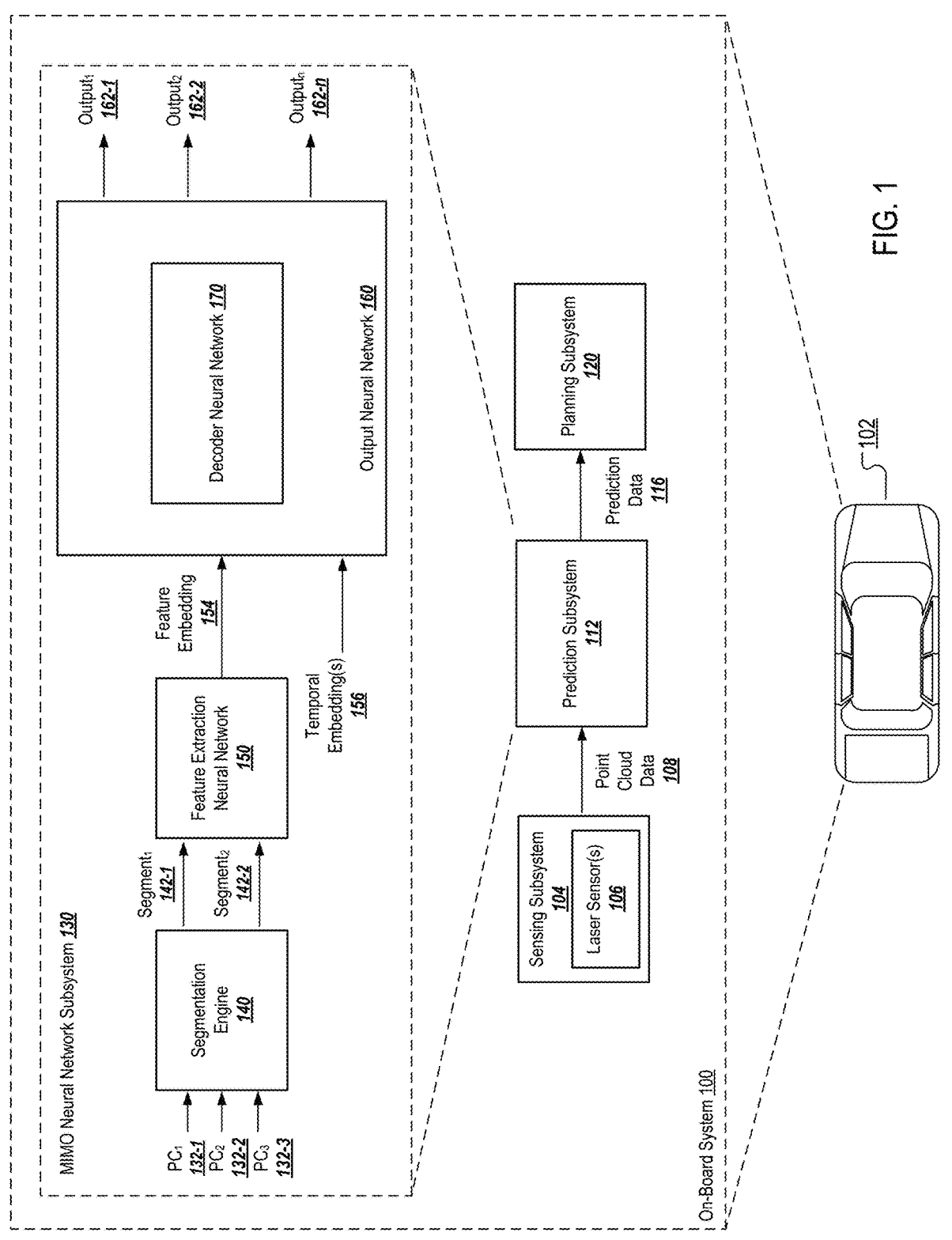
FIG. 1 is a block diagram of an example on-board system.

This specification describes a system implemented as computer programs on one or more computers in one or more locations that obtains a temporal sequence of point clouds generated from sensor readings of an environment collected by one or more sensors within a given time period. The system processes the temporal sequence to generate an output that characterizes the objects in the point clouds.

Each point cloud in the temporal sequence includes multiple points that represent a sensor measurement of a scene in the environment captured by the one or more sensors. For example, the one or more sensors can be sensors, e.g., LiDAR sensors or other sensors that are considered to detect reflections of laser light, of an autonomous vehicle, e.g., a land, air, or sea vehicle, and the scene can be a scene that is in the vicinity of the autonomous vehicle.

The sequence is referred to as a "temporal" sequence because the point clouds are arranged according to the order in which the corresponding sensor measurements were generated. For example, the temporal sequence of point clouds can be obtained from a log of point clouds that have been generated as vehicles navigate through a real-world environment.

Some systems use machine learning algorithms, e.g., neural networks, to recognize and detect objects in point cloud data. However, point cloud data has a number of characteristics that make existing machine learning approaches to processing data less efficient, e.g., in terms of overall model throughput, when applied to point cloud data. Model throughput refers to the rate at which a machine learning model can process point clouds and compute outputs that characterize various objects depicted in the point clouds.

First, point clouds may be dense and, correspondingly, may have an extremely large data size, especially when captured using high-resolution sensors. The sheer volume of data points in a point cloud makes processing and analyzing them computationally intensive.

Second, point cloud data may have a high data dimensionality. Each point in a point cloud is represented by multiple attributes, including intensity and position, and, sometimes additional features such as color information, second return, or normals. Handling data with high dimensionality further increases the computational complexity of the algorithms used for object recognition and detection.

All of these factors mean that existing ways of using machine learning approaches for object recognition and detection in point clouds might result in a computationally expensive process that falls short of the strict real-time requirements of some applications, e.g., autonomous vehicles, which require a computer system to accurately detect and recognize objects in its surroundings with minimal delay. For example, an on-board computer system of an autonomous vehicle that implements existing machine learning algorithms may not be able to generate object characterization data for each of a large number of agents in the vicinity of the vehicle (e.g., when the vehicle is traveling along a busy highway) in a timely manner, e.g., every 10, 20, or 100 milliseconds.

Some techniques described in this specification allow a neural network system to process a temporal sequence of point clouds to generate one or more outputs that characterize various objects in the point clouds at a faster speed—or, put another way—with greater model throughput, sometimes ten times or a hundred times greater, than previously possible by first identifying static points from the temporal sequence of point clouds and generating a sensor data segment that corresponds to all of these identified static points, which is then provided for processing by the neural network system. This can enable higher throughput as duplicated computation related to redundantly processing these identical points in the temporal sequence of point clouds is largely avoided.

In addition, by encoding the temporal sequence of point clouds into one feature embedding and then using a lightweight decoder neural network to process the feature embedding to generate the outputs conditioned on a query input specifying the time points of interest, some techniques described in this specification make it possible to efficiently generate one or more outputs that characterize the objects at different time points. In particular, unlike existing systems in which the output is always generated with respect to a fixed point cloud, e.g., the last point cloud in the temporal sequence, the neural network system described in this specification can generate an arbitrary number of object characterization outputs with respect to arbitrary time points. Advantageously, the time points can include time points at which no point cloud data is available, thereby allowing the system to make more flexible predictions for a wider variety of uses. For example, when multiple sensor inputs with different operating frequencies are received, prediction outputs can be computed based on the inputs from a first sensor at various time points relative to the operating timeline of a second sensor. This flexibility facilitates easier sensor fusion because the outputs are temporally aligned.

FIG. 1 is a block diagram of an example on-board system 100. The on-board system 100 is physically located on-board a vehicle 102. Being on-board the vehicle 102 means that the on-board system 100 includes components that travel along with the vehicle 102, e.g., power supplies, computing hardware, and sensors. In some cases, the vehicle 102 is an autonomous vehicle. An autonomous vehicle can be a fully autonomous vehicle that determines and executes fully-autonomous driving decisions in order to navigate through an environment. An autonomous vehicle can also be a semi-autonomous vehicle that uses predictions to aid a human driver. For example, the vehicle 102 can autonomously apply the brakes if a prediction indicates that a human driver is about to collide with another vehicle. As another example, the vehicle 102 can have an advanced driver assistance system (ADAS) that assists a human driver of the vehicle 102 in driving the vehicle 102 by detecting potentially unsafe situations and alerting the human driver or otherwise responding to the unsafe situation. As a particular example, the vehicle 102 can alert the driver of the vehicle 102 or take an autonomous driving action when an obstacle is detected, when the vehicle departs from a driving lane, or when an object is detected in a blind spot of the human driver. In another example, in response to determining that another agent might interact with the vehicle 102, the vehicle 102 can alert the driver or autonomously apply the brakes of the vehicle 102 or otherwise autonomously change the trajectory of the vehicle 102 to prevent an unwanted interaction between the vehicle 102 and an agent.

Although the vehicle 102 in FIG. 1 is depicted as an automobile, and the examples in this specification are described with reference to automobiles, in general the vehicle 102 can be any kind of vehicle. For example, besides an automobile, the vehicle 102 can be another kind of autonomous vehicle that travels along a roadway, e.g., a truck or a motorcycle. Moreover, the on-board system 100 can include components additional to those depicted in FIG. 1 (e.g., a collision detection system or a navigation system).

To enable the safe control of the autonomous vehicle 102, the on-board system 100 includes a sensor subsystem 104 which enables the on-board system 100 to "see" the environment in the vicinity of the vehicle 102. For example, the environment can be an environment in the vicinity of the vehicle 102 as it drives along a roadway. The term "vicinity," as used in this specification, refers to the area of the environment that is within the sensing range of one or more of the sensors of the vehicle 102. The agents in the vicinity of the vehicle 102 may be, for example, pedestrians, bicyclists, or other vehicles.

The sensor subsystem 104 includes, amongst other types of sensors, one or more laser sensors 106 that are configured to detect reflections of laser light from the environment in the vicinity of the vehicle 102. Examples of a laser sensor 106 include a time-of-flight sensor, a stereo vision sensor, a two-dimensional light detection and ranging (LiDAR) sensor, a three-dimensional LiDAR sensor, and so on.

The sensor subsystem 104 continually (i.e., at each of multiple time points within a given time period) captures raw sensor measurements which can indicate the directions, intensities, and distances travelled by reflected radiation. For example, a laser sensor 106 can transmit one or more pulses of electromagnetic radiation in a particular direction and can measure the intensity of any reflections as well as the time that the reflection was received. A distance can be computed by determining the time which elapses between transmitting a pulse and receiving its reflection. Each laser sensor can continually sweep a particular space in angle, azimuth, or both. Sweeping in angle, for example, can allow the laser sensor to detect multiple objects in an area within the field of view of the laser sensor.

The sensor subsystem 104, or another subsystem such as a data representation subsystem also on-board the vehicle 102, uses the raw sensor measurements (and, optionally, additional data available in data repositories stored within the autonomous vehicle 102, or data repositories outside of, but coupled to, the autonomous vehicle, such as in a data center with the data available made to the autonomous vehicle over a cellular or other wireless network) to generate sensor data that that characterizes the agents and environment in the vicinity of the vehicle 102.

The sensor data includes point cloud data 108. The point cloud data 108 can be generated in any of a variety of ways. In some implementations, the raw laser sensor measurements (e.g., raw LiDAR sensor measurements) can be complied into a point cloud, e.g., a three-dimensional point cloud (e.g., a LiDAR point cloud), with each point having an intensity and a position, and, optionally, other attributes such as color information, second return, or normals. The position can, for example, be represented as either a range and elevation pair, or 3D coordinates (x, y, z), in a coordinate system that is centered around a position on which the one or more laser sensors are located, e.g., the autonomous vehicle 102.

Since the raw sensor measurements are continually captured, the point cloud data 108 can be provided as a data stream that includes a temporal sequence of point clouds. The temporal sequence of point clouds includes multiple point clouds, each corresponding to a specific time window and including points that represent reflections of pulses of laser light transmitted by the sensor within that specific time window. The sequence is referred to as a temporal sequence because the point clouds are arranged according to the order in which the corresponding sensor measurements were captured during the given time period. For example, the point cloud data 108 can include a first point cloud that is generated based on raw laser sensor measurements captured during a first time window, a second point cloud that is generated based on raw laser sensor measurements captured during a second time window that is subsequent to the first time step, and so on. The length of each time window can, for example, depend on the time required by a laser sensor to perform a full sweep or revolution within its field of view.

The on-board system 100 can provide the sensor data including the point cloud data 108 to a prediction subsystem 112 of the on-board system 100. The on-board system 100 uses the prediction subsystem 112 to continually generate prediction data 116 which predicts certain aspects of some or all of the agents in the vicinity of the vehicle 102. In addition, the on-board system 100 can send the sensor data to one or more data repositories within the vehicle 102, or data repositories outside of the vehicle 102, such as in a data center, over a cellular or other wireless network, where the sensor data is logged.

For example, the prediction data 116 can be or include object detection prediction data that specifies one or more regions in an environment characterized by the point cloud data 108 that are each predicted to depict a respective object. For example, the prediction data 116 can be or include object detection prediction data which defines a plurality of 3-D bounding boxes with reference to the environment characterized by the point cloud data 108 and, for each of the plurality of 3-D bounding boxes, a respective likelihood that an object belonging to an object category from a set of possible object categories is present in the region of the environment circumscribed by the 3-D bounding box. For example, object categories can represent animals, pedestrians, cyclists, or other vehicles within a proximity to the vehicle.

As another example, the prediction data 116 can be or include object classification prediction data which includes scores for each of a set of object categories, with each score representing an estimated likelihood that the point cloud data 108 contains a point cloud of an object belonging to the category. For example, the prediction data 116 can specify that the point cloud data 108 likely includes a point cloud of a nearby car.

As yet another example, the prediction data 116 can be or include point cloud segmentation prediction data which defines, for each point included in the temporal sequence of point clouds, which of multiple object categories the point belongs to.

The on-board system 100 can provide the prediction data 116 generated by the prediction subsystem 112 to a planning subsystem 120.

When the planning subsystem 120 receives the prediction data 116, the planning subsystem 120 can use the prediction data 116 to generate planning decisions which plan the future motion of the vehicle 102. The planning decisions generated by the planning subsystem 120 can include, for example: yielding (e.g., to pedestrians), stopping (e.g., at a "Stop" sign), passing other vehicles, adjusting vehicle lane position to accommodate a bicyclist, slowing down in a school or construction zone, merging (e.g., onto a highway), and parking. In a particular example, the on-board system 100 may provide the planning subsystem 116 with trajectory prediction data indicating that the future trajectory of another vehicle is likely to cross the future trajectory of the vehicle 102, potentially resulting in a collision. In this example, the planning subsystem 120 can generate a planning decision to apply the brakes of the vehicle 102 to avoid a collision.

The planning decisions generated by the planning subsystem 120 can be provided to a control subsystem of the vehicle 102. The control subsystem of the vehicle can control some or all of the operations of the vehicle by implementing the planning decisions generated by the planning subsystem. For example, in response to receiving a planning decision to apply the brakes of the vehicle, the control subsystem of the vehicle 102 may transmit an electronic signal to a braking control unit of the vehicle. In response to receiving the electronic signal, the braking control unit can mechanically apply the brakes of the vehicle.

In addition or alternatively, the on-board system 100 can provide the prediction data 116 generated by the prediction subsystem 112 to a user interface subsystem. When the user interface subsystem receives the prediction data 116, the user interface subsystem can use the prediction data 116 to present information to the driver of the vehicle 102 to assist the driver in operating the vehicle 102 safely. The user interface subsystem can present information to the driver of the vehicle 102 by any appropriate means, for example, by an audio message transmitted through a speaker system of the vehicle 102 or by alerts displayed on a visual display system in the vehicle (e.g., an LCD display on the dashboard of the vehicle 102).

To generate the various prediction data 116 from the sensor data, the prediction subsystem 112 implements trained neural networks that are each configured to process inputs derived from the sensor data in accordance with trained parameters of the neural network to generate respective outputs that are included in the prediction data 116. A neural network is said to be "trained" if the parameter values of the neural network have been adjusted, i.e., by applying a training procedure to a training set of inputs, to improve the performance of the neural network on its prediction task. In other words, a trained neural network generates an output based solely on being trained on training data rather than on human-programmed decisions. For convenience, the neural networks as used in throughout this description will generally refer to trained ones.

As illustrated in FIG. 1, to ensure efficiency in processing the point cloud data 108 included in the sensor data, as well as to improve the model throughput when processing the point cloud data 108, the prediction subsystem 112 implements a multi-input multi-output (MIMO) neural network subsystem 130.

The MIMO neural network subsystem 130 receives as input the temporal sequence of point clouds, e.g., point clouds 132-1, 132-2, and 132-3, included in the point cloud data 108 and uses a segmentation engine 140 to generate, from the input, multiple sensor data segments, e.g., sensor data segments 142-1 and 142-2, that include points that correspond respectively to the dynamic and static objects in the point clouds. Each sensor data segment can be represented using any of a variety of known data structures that group points into a collection.

Any of a variety of approaches can be used by the segmentation engine 140 to separate points that correspond to the dynamic objects from points that correspond to static objects in the point clouds. In some implementations, the segmentation engine 140 can adopt a deterministic approach to facilitate the segmentation. For example, a deterministic algorithm can do this based on estimating the velocity (speed and direction of motion) of each point of each point cloud in the temporal sequence and detecting whether the point has moved in relation to a fixed point in the environment, e.g., the ground, between the point clouds. Accordingly, if the point does not change its position in relation to the fixed point in the environment, then it can be classified as a point that belongs to a static object. On the contrary, if the point changes its position appreciably in relation to the fixed point in the environment, then it can be classified as a point that belongs to a dynamic object.

In some other implementations, the segmentation engine 140 can adopt a neural network-based approach for segmentation. One example of such an approach is using velocity estimation together with dynamic voxelization. Object velocity estimation from point cloud data can be done, e.g., by using the techniques disclosed in Yin, Tianwei, et al. "Center-based 3d object detection and tracking." Proceedings of the IEEE/CVF conference on computer vision and pattern recognition. 2021. Dynamic voxelization involves generating a voxel representation that assigns each point of each 3-D point cloud in the temporal sequence to a respective voxel of a plurality of voxels. The plurality of voxels includes one or more voxels that include (i) dynamic points the coordinate of which have changed during the given time period, and (ii) one or more voxels having static points the coordinate of which have not changed during the given time period. In particular, unlike in hard voxelization approaches, the dynamic voxel representation does not have a fixed number of voxels or a fixed number of points per voxel.

Instead, the dynamic voxel representation has a variable number of voxels, i.e., has different numbers of voxels for different sets of 3-D points, and a variable number of points per voxel. Dynamic voxelization is described in more detail in U.S. Pat. No. 11,164,363B2.

Another example of such an approach is velocity-assisted segmentation, e.g., Doppler-assisted segmentation. Velocity-assisted segmentation groups various points within the temporal sequence of point clouds into clusters corresponding to various objects, including moving objects and stationary objects, that have different velocities. Clusters can be grouped based on proximity of points in space, proximity of velocities of various points, or both. Velocity-assisted segmentation is described in more detail in US patent publication US20220137227A1.

It should be noted that these example approaches described above are not exhaustive, and other techniques for the point cloud segmentation may also be used.

The MIMO neural network subsystem 130 generates one or more dynamic object sensor data segments for the dynamic objects in the point clouds in the temporal sequence. The dynamic object sensor data segments include points that belong to the dynamic objects in the point clouds. In some implementations, the MIMO neural network subsystem 130 generates a corresponding dynamic object sensor data segment for each point cloud in the temporal sequence. That is, for each point cloud in the temporal sequence, the subsystem generates a segment that includes points belonging to the dynamic objects in the point cloud.

The MIMO neural network subsystem 130 also generates one or more static object sensor data segment for the static objects in the point clouds in the temporal sequence. In some implementations, the MIMO neural network subsystem 130 generates one static object sensor data segment which includes all of the points that belong to the static objects in the multiple point clouds in the temporal sequence.

In some implementations, the MIMO neural network subsystem 130 generates the sensor data segments such that each point included in a sensor data segment has additional attributes that (i) indicate its dynamic/static state, (ii) identifies the time point at which the point cloud that includes the point was generated, or both (i) and (ii).

In this specification, dynamic objects (also referred to as moving objects or foreground objects) are objects that have moved, e.g., at a speed that is greater than a predetermined threshold speed, relative to a fixed point in the environment, e.g., the ground, (and/or changed their configuration) during the given time period, such as traveling vehicles, traveling cyclists, walking pedestrians, and moving animals, among other examples, while static objects (also referred to as stationary objects or background objects) are objects that have not moved, e.g., at a speed that is greater than the predetermined threshold speed, relative to a fixed point in the environment, e.g., the ground, (and/or changed their configuration) during the given time period, such as streets, curbs, lane markings, traffic lights, stop signs, and buildings, among other examples. Depending on their states of motion, some objects can be dynamic within one time period and static within another time period. For example, a vehicle that is travelling on a roadway is a dynamic object, whereas the same vehicle when stopped before a red line is a static object.

At any time when navigating through the real-world environment, the number of dynamic objects is generally much smaller than the number of static objects. In other words, while each point cloud includes a large number of points, e.g., 100k points, 150k points, 200k points, or more, only a relatively small number of these points, e.g., approximately one fifth or one tenth of them, may actually correspond to dynamic objects in the environment. By identifying the points that correspond to one or more static objects from each point cloud in the temporal sequence and generating one sensor data segment for all of these identified points, which is subsequently provided as input to the feature extraction neural network 150, i.e., in place of multiple three-dimensional point clouds in which these points are redundant or identical from one point cloud to another, the MIMO neural network subsystem 130 avoids having to process the multiple point clouds redundantly to extract the same feature information.

In the meantime, by identifying the points that correspond to one or more dynamic objects from each three-dimensional point cloud and generating a temporal sequence of multiple sensor data segments which generally contain information about one or more object tracks that each correspond to a different dynamic object in the environment, the MIMO neural network subsystem 130 leverages time stamp information of the points to more precisely track the movement of various object across multiple point cloud frames. This, in turn, will assist the network in better handling objects that are occluded, of significant size, or both. Objects that are of significant size can include vehicles, e.g., trucks, tractor-trailer units, recreational vehicles, buses, tall work vans, and ambulances, that have greater than normal (e.g., standard) dimensions.

The MIMO neural network subsystem 130 processes the sensor data segments, e.g., sensor data segments 142-1 and 142-2, using a feature extraction neural network 150 to generate a feature embedding 154 from the sensor data segments. For example, the feature embedding 154 can be generated as a combination, e.g., concatenation, of the dynamic and static object sensor data segments.

The feature extraction neural network 150 can be implemented using any suitable network architecture, e.g., an attention neural network architecture, a multilayer perceptron architecture, or a 3-D convolutional neural network architecture, that enables it to extract feature data from the sensor data segments. Examples of such a suitable network architecture are described in Qi, Charles R., et al. "Pointnet: Deep learning on point sets for 3d classification and segmentation." Proceedings of the IEEE conference on computer vision and pattern recognition. 2017, and in Ronneberger, Olaf, Philipp Fischer, and Thomas Brox. "U-net: Convolutional networks for biomedical image segmentation." International Conference on Medical image computing and computer-assisted intervention. Springer, Cham, 2015, the entire contents of which are hereby incorporated by reference herein.

When implemented as one of these example network architectures, the feature embedding 154 generated by the feature extraction neural network 150 can include, for example, spatial feature data describing the locations of the one or more objects within the point clouds, temporal feature data describing the movement of the one or more objects across the point clouds, or both.

The MIMO neural network subsystem 130 provides the generated feature embedding 154 to an output neural network 160 for use in computing one or more outputs, e.g., output 162-1-output 162-n. Depending on the configuration of the output neural network 160, each output can include any kind of object detection prediction data, object classification prediction data, segmentation prediction data, and so on. As a particular example, the output neural network 160 can be configured as an object detection neural network, where each output can be an object detection output that identifies, e.g., using bounding boxes, respective locations of one or more dynamic objects, one or more static objects, or both in the point clouds. For each of the one or more dynamic objects, the output can additionally define a velocity (speed and direction of motion) of the dynamic object.

Using such a MIMO neural network subsystem 130 as a part of the on-board system 100 of the vehicle 102 can be advantageous. For example, because the MIMO neural network subsystem 130 can receive long or extra-long history contexts as input, it has the capability to better handle occluded objects, and, therefore, generate more accurate prediction outputs, than typical perception systems that only consume current and near-history point clouds.

In some implementations, the MIMO neural network subsystem 130 is configured to receive, e.g., from another component of the on-board system 100, e.g., a different software module in the prediction subsystem 112 or in the planning subsystem 120, a query input that specifies one or more time points within the given time period. In some of these implementations, the MIMO neural network subsystem 130 can then use the output neural network 160 to generate one or more outputs from the feature embedding 154 conditioned on the query. For example, the query input may specify an arbitrary number of time points within the given time period, and the output will be computed with respect to the time points specified by the query input, e.g., an object detection output that identifies instant locations of objects at a particular time point.

In others of these implementations, the MIMO neural network subsystem 130 also provides the feature embedding 154 for storage in a data repository outside of, but coupled to, the autonomous vehicle 102, such as in a data center. Like the MIMO neural network subsystem 130, another system that is hosted in the data center can receive a query input that specifies one or more time points within the given time period and then use an output neural network to generate, conditioned on the query, one or more outputs from the feature embedding 154 that is stored in the data repository.

In those other implementations, the output neural network that is hosted in the data center may or may not have the same configuration as the output neural network 160 that is implemented on-board the vehicle 102. For example, the output neural network can be configured as an auto labeling neural network, and the output can be an auto labeling output. Auto labeling the sensor data refers to automatically, i.e., from only the point cloud data and without any manual user involvement, identifying three-dimensional regions, e.g., three-dimensional boxes or regions made up of individual contours, in the point clouds that correspond to objects, i.e., such that any given point that is within the region is a measurement of the same object. In this example, auto labeling output can be used for any of a variety of purposes, e.g., to generate labels for training machine learning models, to generate user interface presentations that show users the positions of objects surrounding the autonomous vehicle or that allow the predictions made by the auto labeling process to be easily verified or refined by users, and so on.

Notably, in any of these implementations, the query input can include any time point within the given time period, including time points on which no point cloud has been generated from the sensor readings collected by one or more sensors.

To generate the outputs conditioned on the query from the feature embedding 154, the MIMO neural network subsystem 130 generates a temporal embedding 156 from the query, and concatenates the temporal embedding 156 to the feature embedding 154 to generate a concatenation. When the query specifies multiple time points, the subsystem can generate one temporal embedding 156 corresponding to each of the multiple time points, and then separately concatenate each of the multiple temporal embeddings 156 to the feature embedding 154 to generate a respective concatenation. Each temporal embedding 156 can include a distinct sequence of numeric values that uniquely identifies the corresponding time point. Any of a variety of temporal encoding schemes, e.g., a sinusoidal temporal encoding scheme or another fixed or learned temporal encoding scheme, can be used to generate these temporal embeddings 156.

The MIMO neural network subsystem 130 then processes the concatenation of the feature embedding 154 and the temporal embedding 156 using the output neural network 160 to generate an output. Generally, during each forward pass through the output neural network 160, the system can generate a respective output corresponding to one of the time points specified in the query, i.e., an output that characterizes the objects in the environment at that time point.

In some implementations, the output neural network 160 implements a decoder neural network, e.g., decoder neural network 170 as illustrated in FIG. 1, that is used to process different concatenations that include different temporal embeddings, i.e., such that the same decoder neural network will generate different outputs that characterize one or more objects in the environment at different time points. The decoder neural network 170 can be a parameter efficient model, i.e., can include a relatively small number of model parameters. For example, the decoder neural network 170 can be configured as a lightweight multi-layer perceptron model having a small number of fully connected layers, a lightweight attention neural network having a small number of attention layers, or the like.

Therefore, while the MIMO neural network subsystem 130 generally performs one forward pass through the feature extraction neural network 150 to generate the feature embedding 154 for the temporal sequence of point clouds, the subsystem may perform multiple forward passes through (at least some components of) the output neural network 160 to generate the multiple outputs. However, because the output neural network 160 can be configured as a parameter efficient model, this adds minimum additional computational overhead.

Figure 2:
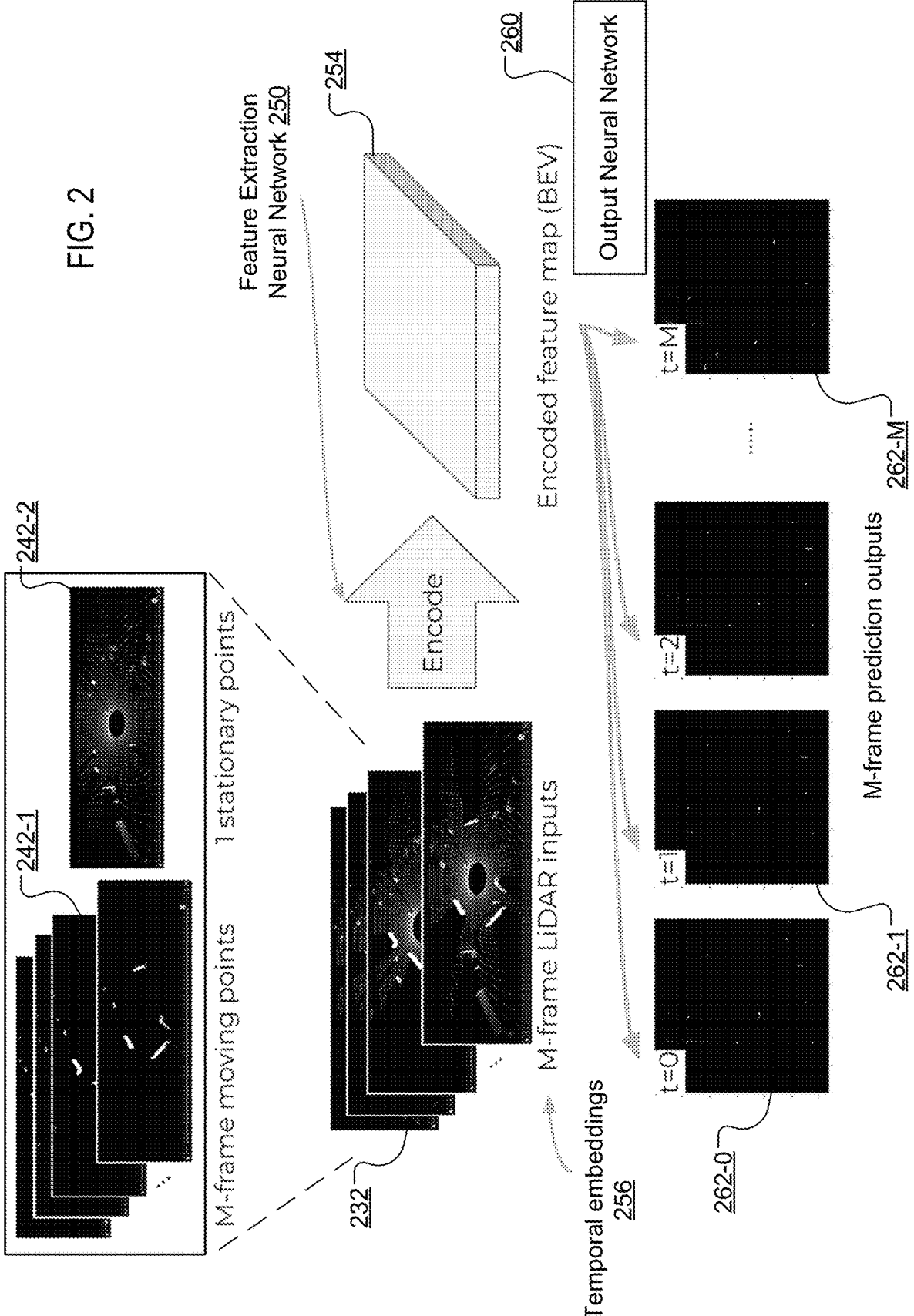
FIG. 2 is an example illustration of operations performed by a multi-input multi-output (MIMO) neural network subsystem.

FIG. 2 is an example illustration of operations performed by a multi-input multi-output (MIMO) neural network subsystem. As illustrated, the MIMO neural network subsystem obtains a temporal sequence of M three-dimensional (3-D) point clouds 232 generated from sensor readings of an environment collected by a LiDAR sensor, where each of the M 3-D point cloud corresponds to a specific time window in a given time period and includes points that represent reflections of pulses of laser light transmitted by the LiDAR sensor within that specific time window.

The MIMO neural network subsystem generates one or more sensor data segments that includes points that correspond to one or more dynamic objects in the environment. Each dynamic object is an object that has moved relative to a fixed point in the environment, e.g., the ground during the given time period. As illustrated, for each 3-D point cloud in the temporal sequence, the MIMO neural network subsystem generates a corresponding sensor data segment, e.g., sensor data segment 242-1, that includes points in the 3-D point cloud that correspond to the dynamic objects. The MIMO neural network subsystem also generates a sensor data segment, e.g., sensor data segment 242-2, that includes points in all of the 3-D point clouds in the temporal sequence that correspond to one or more static objects in the environment that have not moved relative to the fixed point in the environment during the given time period.

Optionally, time offsets are added to the points in the sensor data segments that include points corresponding to the dynamic objects. For example, a first time offset represented by one or more numeric values can be added, e.g., as an extra attribute, to each point in a dynamic sensor data segment that corresponds to the first 3-D point cloud in the temporal sequence, a second time offset represented by one or more numeric values can be added, e.g., as an extra attribute, to each point in a dynamic sensor data segment that corresponds to the second 3-D point cloud in the temporal sequence, and so on.

The MIMO neural network subsystem uses a feature extraction neural network 250 to process the sensor data segments to generate a feature embedding 254. In the example of FIG. 2, the feature embedding 254 takes the form of a bird's eye view encoded feature map. In other examples, the feature embedding 254 can have the same or different forms, as will be appreciated.

The MIMO neural network subsystem generates multiple temporal embeddings 256 that correspond respectively to M different time points within the given time period. Each temporal embedding can include a distinct sequence of numeric values that uniquely identifies the one of the M different time points. Each temporal embedding is separately concatenated to the feature embedding 254 to generate a respective concatenation, which is then provided as input to an output neural network 260 to generate the M-frame prediction outputs.

For example, the MIMO neural network subsystem generates a first concatenation that includes (i) the feature embedding 254 and (ii) a first temporal embedding that corresponds to time point t=0, a second concatenation that includes (i) the feature embedding 254 and (ii) a second temporal embedding that corresponds to time point t=1, and so on.

The MIMO neural network subsystem uses the output neural network 260 to process the concatenations to generate one or more outputs. For example, the MIMO neural network subsystem processes the first concatenation using the output neural network 260 to generate a first output 262-0 that corresponds to time point t=0, processes the second concatenation using the output neural network 260 to generate a second output 262-1 that corresponds to time point t=1, and so on. Each output can be, for example, a point cloud classification output, an object detection output, a point cloud segmentation output, or the like.

In the example of FIG. 2, the output neural network 260 uses the same decoder neural networks to process different concatenations that include different temporal embeddings corresponding to different time points to generate a corresponding output with reference to each of the M different time points.

The components of the MIMO neural network subsystem in FIG. 2 can be trained end-to-end. Training the MIMO neural network subsystem can involve generating a training dataset that defines, for each of multiple temporal sequences of point clouds, a mapping from the temporal sequence of point clouds to ground truth prediction outputs for each point cloud included in the sequence, and then applying the training dataset to determine parameter value updates to the components of the subsystem based on any of a variety of supervised training techniques, e.g., that involve optimizing a supervised 3-D object detection and/or classification loss with respect to training outputs generated by (a regression or classification head) of the output neural network.

Figure 3:
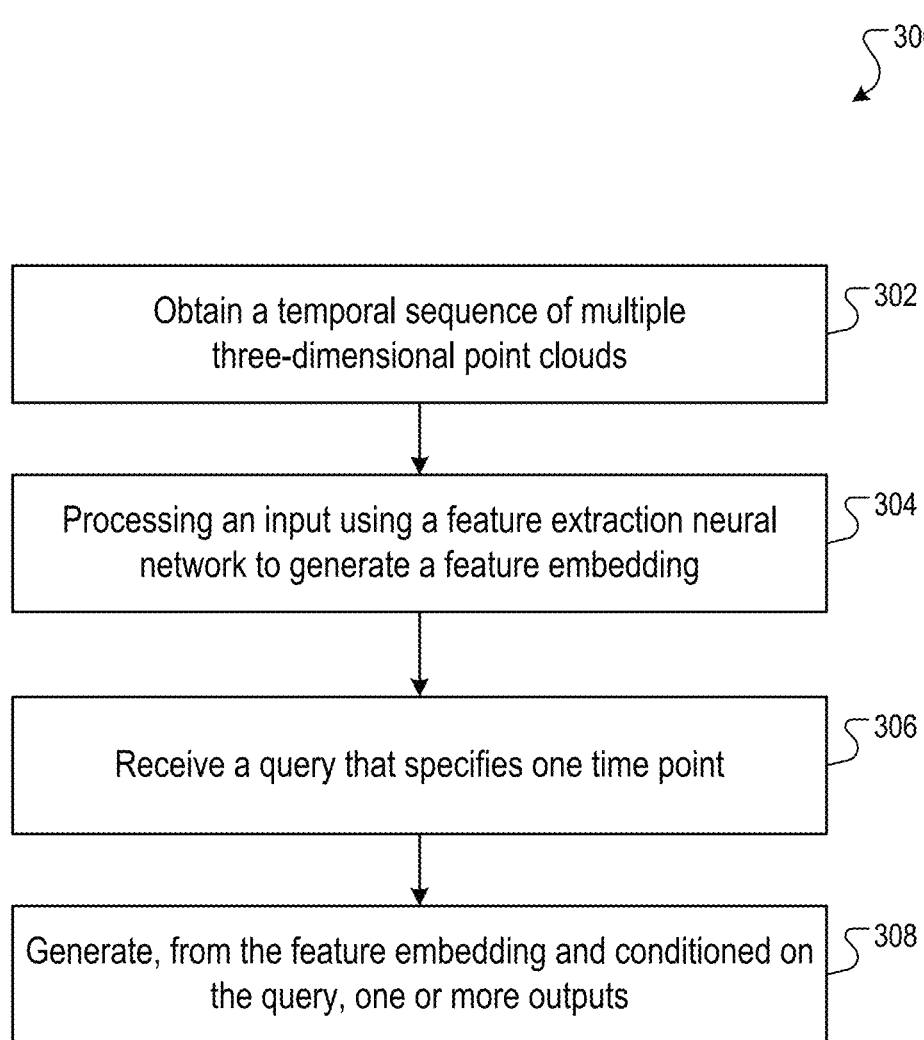
FIG. 3 is a flow diagram of an example process for generating one or more outputs by a multi-input multi-output (MIMO) neural network subsystem.

FIG. 3 is a flow diagram of an example process 300 for generating one or more outputs by a multi-input multi-output (MIMO) neural network subsystem. For convenience, the process 300 will be described as being performed by a system of one or more computers located in one or more locations. For example, a system, e.g., the on-board system 100 of FIG. 1, appropriately programmed in accordance with this specification, can perform the process 300.

The system obtains a temporal sequence of multiple three-dimensional (3-D) point clouds (step 302). Each 3-D point cloud in the temporal sequence includes multiple points that represent a sensor measurement of a scene in the environment captured by the one or more sensors. For example, the one or more sensors can be sensors, e.g., LiDAR sensors or other sensors that are considered to detect reflections of laser light, of an autonomous vehicle, e.g., a land, air, or sea vehicle, and the scene can be a scene that is in the vicinity of the autonomous vehicle.

The sequence is referred to as a temporal sequence because the 3-D point clouds are arranged according to the order in which the corresponding sensor measurements were generated. For example, the temporal sequence of 3-D point clouds can be obtained from a log of point clouds that have been generated over a given time period as vehicles navigate through a real-world environment.

Each point in a 3-D point cloud has an intensity and a position, and, optionally, other attributes such as color information, second return, or normals. The position can, for example, be represented as either a range and elevation pair, or 3D coordinates (x, y, z), in a coordinate system that is centered around a position on which the one or more laser sensors are located, e.g., the autonomous vehicle.

The system processes, using a feature extraction neural network, an input that includes data derived from the temporal sequence of multiple 3-D point clouds to generate a feature embedding (step 304). The feature extraction neural network can be any neural network that is configured to extract feature data, e.g., spatial feature data, temporal feature data, or both of the points included in the point clouds.

In particular, the data derived from the temporal sequence of multiple 3-D point clouds includes sensor data segments generated from the multiple 3-D point clouds. Each sensor data segment can include a proper subset of the points included in one or more of the multiple 3-D point clouds. Generating the sensor data segments is explained in more detail with reference to FIG. 4, which shows sub-steps 402-406 corresponding to step 304.

Figure 4:
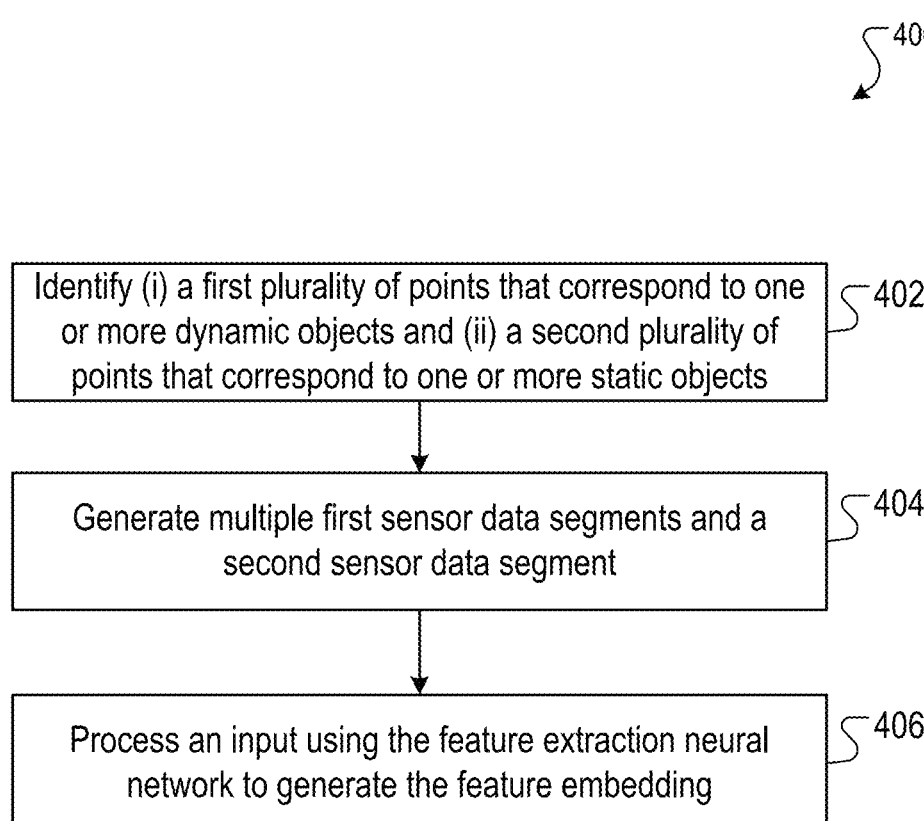
FIG. 4 is a flow diagram of sub-steps of one of the steps of the process of FIG. 3.

FIG. 4 is a flow diagram of sub-steps of one of the steps of the process of FIG. 3.

The system identifies, from each 3-D point cloud in the temporal sequence, (i) a first plurality of points that correspond to one or more dynamic objects and (ii) a second plurality of points that correspond to one or more static objects (step 402). A dynamic object is an object in the environment that have moved relative to a fixed point in the environment, e.g., the ground, during the given time period, while a static object is an object in the environment that have not moved relative to the fixed point in the environment during the given time period. Identification of the dynamic/static objects, and, correspondingly, the first/second plurality of points can be done by applying any of the techniques mentioned above and possibly other known point cloud segmentation techniques to the 3-D point clouds.

The system generates one or more first sensor data segments that include the first plurality of points and one or more second sensor data segments that include the second plurality of points (step 404). In some implementations, the system generates one first sensor data segment corresponding to each 3-D point cloud included in the temporal sequence, where each first sensor data segment includes the points that have been identified as belonging to the dynamic objects within the corresponding 3-D point cloud; on the other hand, the system generates one second sensor data segment corresponding to all of the 3-D point clouds included in the temporal sequence, where the second sensor data segment includes all of the points that have been identified as belonging to the static objects within the multiple 3-D point clouds.

In some implementations, the system additionally adds time offsets to the multiple first sensor data segments, such that the first sensor data segments that correspond respectively to different time points within the given time period will each have a different time offset. When added, the time offsets may be used to relate information about the points across different segments, e.g., the position of different points within different first sensor data segments that all belong to the same dynamic object.

The system generates an input that includes the one or more first sensor data segments and the one or more second sensor data segments and provide the input for processing by the feature extraction neural network to generate the feature embedding (step 406).

Returning to FIG. 3, the system receives a query that specifies a time point (step 306). For example, the query may be received from another component of the on-board system 100 in FIG. 1, e.g., a different software module in the prediction subsystem or in the planning subsystem. As another example, the query may be received from a system administrator.

In particular, the time point can be any time point within the given time period, even including time points at which no point cloud data is available. For example, the time point can be a time point at which a sensor has not yet completed a full sweep (since the most recent full sweep) within its field of view to capture raw sensor measurements that are used to generate a point cloud.

The system generates one or more outputs that characterize one or more objects in the environment at the time point specified in the received query (step 308). Generating the one or more outputs is explained in more detail with reference to FIG. 5, which shows sub-steps 502-506 corresponding to step 308.

Figure 5:
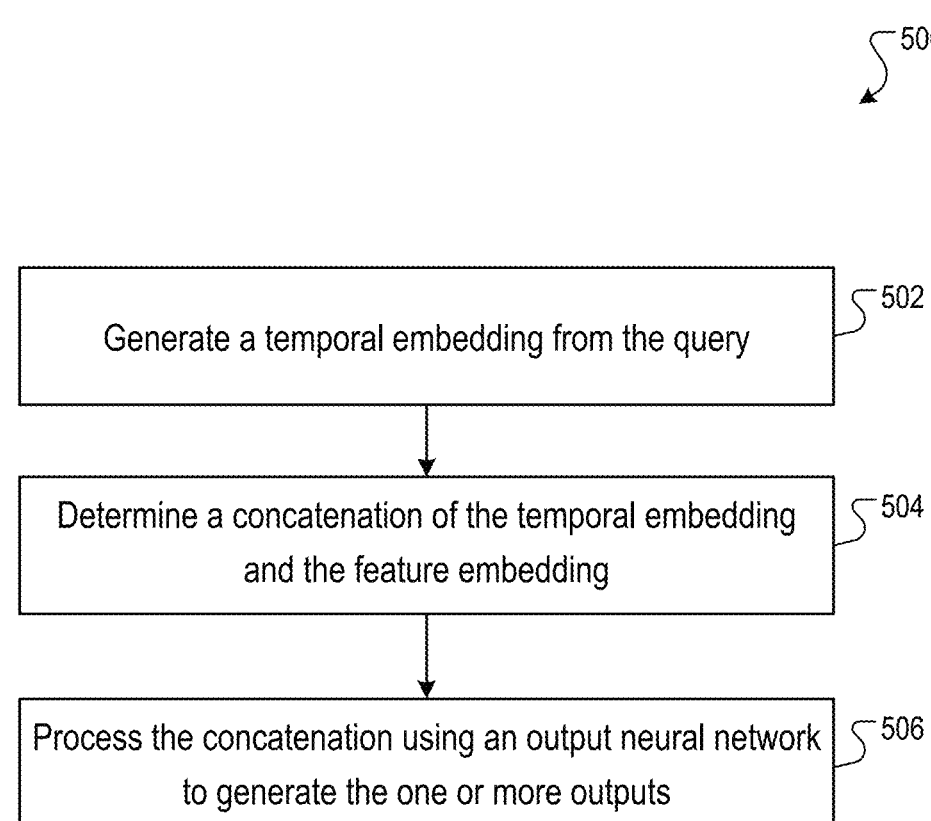
FIG. 5 is a flow diagram of sub-steps of one of the steps of the process of FIG. 3.

FIG. 5 is a flow diagram of sub-steps of one of the steps of the process of FIG. 5.

The system generates a temporal embedding from the query (step 502). The temporal embedding can include a sequence of numeric values that identifies the time point specified in the received query.

The system concatenates the temporal embedding to the feature embedding, which has been generated by the feature extraction neural network, to generate a concatenation of the temporal embedding and the feature embedding (step 504).

The system processes the concatenation using an output neural network to generate the one or more outputs that characterize one or more objects in the environment at the time point specified in the received query (step 506). Depending on the configuration of the output neural network, the output can include any kind of object detection prediction data, object classification prediction data, segmentation prediction data, and so on.

As a particular example, the output neural network can be configured as an object detection neural network, where the one or more outputs can include an object detection output that identifies, e.g., using bounding boxes, respective locations of one or more dynamic objects, one or more static objects, or both at the time point. The locations can be defined in the same coordinate system as the point clouds. For each of the one or more dynamic objects, the output can additionally define a velocity (speed and direction of motion) of the dynamic object as of the time point.

In general, by repeatedly performing steps 308 and 310 the system can generate different outputs with reference to different time points within the same given time period. For example, the system can receive an additional query that specifies another time point within the given time period and, in response, generate one or more additional outputs that characterize the one or more objects in the environment at the other time point specified in the additional query.

In this example, the system can generate from the additional query a new temporal embedding that identifies the other time point, concatenate the new temporal embedding to the feature embedding (the same feature embedding generated at step 406), and subsequently provide the concatenation for processing by the output neural network to generate one or more additional outputs that characterize the one or more objects in the environment at the other time point specified in the additional query. As such, generating these additional outputs can be very fast since the same feature embedding can be reused, and only a much less data-intensive temporal embedding need to be recomputed for every new query (so long as it specifies a time point within the same given time period).

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework or a JAX framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a sub combination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:
obtaining a temporal sequence of multiple three-dimensional point clouds generated from sensor readings of an environment collected by one or more sensors within a given time period, each three-dimensional point cloud comprising a respective plurality of points in a first coordinate system;
processing, using a feature extraction neural network, an input that comprises data derived from the temporal sequence of multiple three-dimensional point clouds to generate a feature embedding that corresponds to the given time period;
receiving a query that specifies a first time point and a second time point within the given time period;
generating a first identifier that uniquely identifies the first time point within the given time period, and a second identifier that uniquely identifies the second time point within the given time period;
generating, based on making a first forward pass through an output neural network using the first identifier and the feature embedding, one or more first outputs that characterize one or more objects in the environment at the first time point specified in the query; and
generating, based on making a second forward pass through the output neural network using the second identifier and the feature embedding, one or more second outputs that characterize the one or more objects in the environment at the second time point specified in the query.

2. The method of claim 1, wherein the query specifies a time point within the given time period at which a three-dimensional point cloud has not been generated because the one or more sensors have not completed a full sweep since a most recent full sweep.

3. The method of claim 1, wherein processing the input comprising data derived from the temporal sequence of multiple three-dimensional point clouds using the feature extraction neural network to generate the feature embedding comprises:
identifying, from each three-dimensional point cloud in the temporal sequence, (i) a first plurality of points that correspond to one or more dynamic objects in the environment that have moved during the given time period and (ii) a second plurality of points that correspond to one or more static objects in the environment that have not moved during the given time period;
generating multiple first sensor data segments that include the first plurality of points and a second sensor data segment that includes the second plurality of points;
processing an input comprising the multiple first sensor data segments and the second sensor data segment using the feature extraction neural network to generate the feature embedding.

4. The method of claim 3, wherein identifying the first plurality of points and the second plurality of points comprises:
generating a voxel representation that assigns each point of each three-dimensional point cloud in the temporal sequence to a respective voxel of a plurality of voxels.

5. The method of claim 4, wherein the plurality of voxels comprises one or more voxels having dynamic points the coordinate of which have changed during the given time period, and one or more voxels having static points the coordinate of which have not changed during the given time period.

6. The method of claim 3, wherein generating the multiple first sensor data segments that include the first plurality of points comprises adding time offsets to the multiple first sensor data segments.

7. The method of claim 3, wherein generating the multiple first sensor data segments that include the first plurality of points comprises:
generating one first sensor data segment corresponding to each three-dimensional point cloud included in the temporal sequence.

8. The method of claim 1, wherein the feature extraction neural network is configured to extract spatial temporal features of the plurality of points from the input.

9. The method of claim 1, wherein the one or more outputs that characterize the one or more objects comprises data defining a bounding box for each object.

10. The method of claim 9, wherein for each dynamic object in the environment, the output further comprises data defining a velocity of the dynamic object.

11. The method of claim 1, wherein the one or more outputs that characterize the one or more objects is an auto labeling output.

12. The method of claim 1, wherein generating the one or more first outputs comprises:

generating a first concatenation of based on concatenating the first identifier to the feature embedding; and processing the concatenation using the output neural network to generate the one or more first outputs.

13. The method of claim 1, wherein the first identifier comprises a first sequence of numeric values, and wherein generating the first identifier comprises applying a sinusoidal temporal encoding scheme.

14. A system comprising one or more computers and one or more storage devices storing instructions that, when executed by the one or more computers, cause the one or more computers to perform operations comprising:

obtaining a temporal sequence of multiple three-dimensional point clouds generated from sensor readings of an environment collected by one or more sensors within a given time period, each three-dimensional point cloud comprising a respective plurality of points in a first coordinate system;

processing, using a feature extraction neural network, an input that comprises data derived from the temporal sequence of multiple three-dimensional point clouds to generate a feature embedding that corresponds to the given time period;

receiving a query that specifies a first time point and a second time point within the given time period;

generating a first identifier that uniquely identifies the first time point within the given time period, and a second identifier that uniquely identifies the second time point within the given time period;

generating, based on making a first forward pass through an output neural network using the first identifier and the feature embedding, one or more first outputs that characterize one or more objects in the environment at the first time point specified in the query; and generating, based on making a second forward pass through the output neural network using the second identifier and the feature embedding, one or more second outputs that characterize the one or more objects in the environment at the second time point specified in the query.

15. The system of claim 14, wherein the query specifies a time point within the given time period at which a three-dimensional point cloud has not been generated because the one or more sensors have not completed a full sweep since a most recent full sweep.

16. The system of claim 14, wherein processing the input comprising data derived from the temporal sequence of multiple three-dimensional point clouds using the feature extraction neural network to generate the feature embedding comprises:

identifying, from each three-dimensional point cloud in the temporal sequence, (i) a first plurality of points that correspond to one or more dynamic objects in the environment that have moved during the given time period and (ii) a second plurality of points that correspond to one or more static objects in the environment that have not moved during the given time period;

generating multiple first sensor data segments that include the first plurality of points and a second sensor data segment that includes the second plurality of points;

processing an input comprising the multiple first sensor data segments and the second sensor data segment using the feature extraction neural network to generate the feature embedding.

17. The system of claim 16, wherein identifying the first plurality of points and the second plurality of points comprises:

generating a voxel representation that assigns each point of each three-dimensional point cloud in the temporal sequence to a respective voxel of a plurality of voxels.

18. The system of claim 17, wherein the plurality of voxels comprises one or more voxels having dynamic points the coordinate of which have changed during the given time period, and one or more voxels having static points the coordinate of which have not changed during the given time period.

19. The system of claim 14, wherein the first identifier comprises a first sequence of numeric values, and wherein generating the first identifier comprises applying a sinusoidal temporal encoding scheme.

20. One or more non-transitory computer-readable storage media storing instructions that when executed by one or more computers cause the one or more computers to perform operations comprising:

obtaining a temporal sequence of multiple three-dimensional point clouds generated from sensor readings of an environment collected by one or more sensors within a given time period, each three-dimensional point cloud comprising a respective plurality of points in a first coordinate system;

processing, using a feature extraction neural network, an input that comprises data derived from the temporal sequence of multiple three-dimensional point clouds to generate a feature embedding that corresponds to the given time period;

receiving a query that specifies a first time point and a second time point within the given time period;

generating a first identifier that uniquely identifies the first time point within the given time period, and a second identifier that uniquely identifies the second time point within the given time period;

generating, based on making a first forward pass through an output neural network using the first identifier and the feature embedding, one or more first outputs that characterize one or more objects in the environment at the first time point specified in the query; and generating, based on making a second forward pass through the output neural network using the second identifier and the feature embedding, one or more second outputs that characterize the one or more objects in the environment at the second time point specified in the query.

* * * * *